(12) United States Patent
Patra et al.

(10) Patent No.: US 11,228,868 B2
(45) Date of Patent: Jan. 18, 2022

(54) METHOD AND SYSTEM FOR MANAGING QUALITY OF SERVICE OF EVOLVED MULTIMEDIA BROADCAST MULTICAST SERVICE (EMBMS) SERVICE

(71) Applicant: Samsung Electronics Co., Ltd., Suwon-si (KR)

(72) Inventors: Chandan Swarup Patra, Bengaluru (IN); Naveen Kumar Srinivasa Naidu, Bengaluru (IN); Sridharan Natarajan, Bengaluru (IN); Sudheer Kumar Hundi, Bengaluru (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 37 days.

(21) Appl. No.: 16/640,587

(22) PCT Filed: Nov. 15, 2018

(86) PCT No.: PCT/KR2018/014033
§ 371 (c)(1),
(2) Date: Feb. 20, 2020

(87) PCT Pub. No.: WO2019/098720
PCT Pub. Date: May 23, 2019

(65) Prior Publication Data
US 2020/0213814 A1 Jul. 2, 2020

(30) Foreign Application Priority Data

Nov. 17, 2017 (IN) .............................. 201741041279
Sep. 5, 2018 (IN) .............................. 2017 41041279

(51) Int. Cl.
*H04W 4/06* (2009.01)
*H04W 24/08* (2009.01)
*H04W 28/24* (2009.01)

(52) U.S. Cl.
CPC ............. *H04W 4/06* (2013.01); *H04W 24/08* (2013.01); *H04W 28/24* (2013.01)

(58) Field of Classification Search
None
See application file for complete search history.

(56) References Cited

U.S. PATENT DOCUMENTS

2012/0155282 A1  6/2012  Dorenbosch
2012/0269110 A1  10/2012  Walker et al.
(Continued)

OTHER PUBLICATIONS

3GPP TSG 26.346 V14.4.0, 3rd Generation Partnership Project, Technical Specification Group Services and System Aspects, Multimedia Broadcast/Multicast Service (MBMS), Protocols and codecs, Sep. 22, 2017, Valbonne—France.

*Primary Examiner* — Ayanah S George
(74) *Attorney, Agent, or Firm* — Jefferson IP Law, LLP

(57) ABSTRACT

Embodiments herein provide a method for managing Quality of Service (QoS) for multiple Evolved Multimedia Broadcast Multicast Service (eMBMS) services in a wireless communication system. The method includes detecting, by a network node, more than one Multimedia Broadcast-Multicast Service (MBMS) services in a group of MBMS services have a similar popularity index. Further, the method includes identifying, by the network node, which eMBMS service has more number of users facing Quality of Experience (QoE) issues, in response to detecting that the more than MBMS service in the group of MBMS services have the similar popularity index. Further, the method includes localizing, by the network node, whether the QoE issue is from at least one of the core network, the access network, the single eNB or a complete Multimedia Broadcast Single Frequency network (MBSFN) area. Furthermore, the
(Continued)

method includes dynamically modifying, by the network node, QoS parameters based on the identification of the QoS issue.

12 Claims, 8 Drawing Sheets

(56) References Cited

U.S. PATENT DOCUMENTS

| | | |
|---|---|---|
| 2013/0136036 A1 | 5/2013 | Chen et al. |
| 2013/0311644 A1 | 11/2013 | Herger et al. |
| 2014/0074859 A1* | 3/2014 | Swaminathan ........ G06Q 30/02 707/748 |
| 2015/0138994 A1 | 5/2015 | Dadheech et al. |
| 2015/0365459 A1* | 12/2015 | Assem Aly Salama ..................... H04L 65/80 709/219 |
| 2017/0094359 A1 | 3/2017 | Basra |
| 2017/0238148 A1 | 8/2017 | Kolan et al. |
| 2017/0347279 A1* | 11/2017 | Bejerano ............... H04W 24/02 |

* cited by examiner

[Fig. 1a]
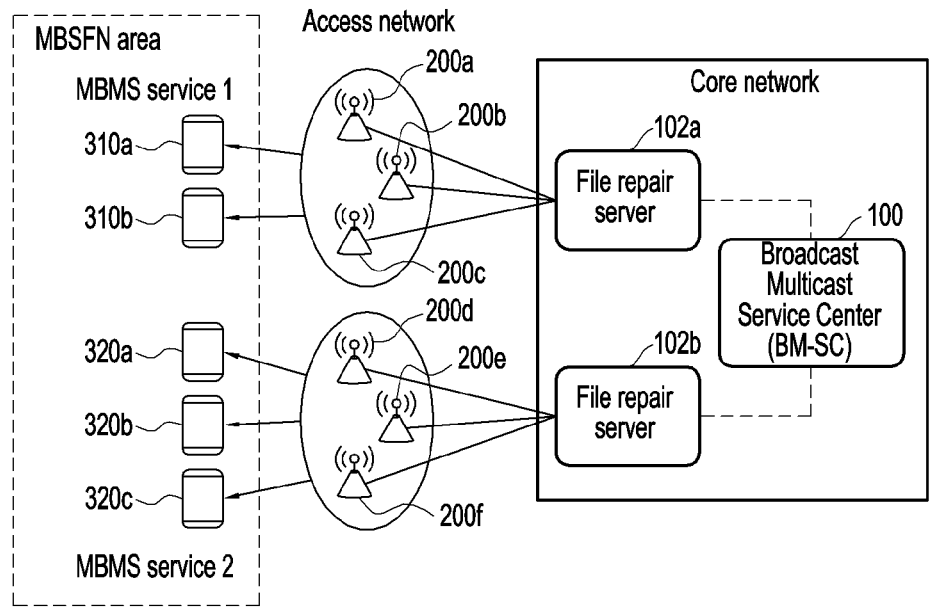
[Fig. 1b]
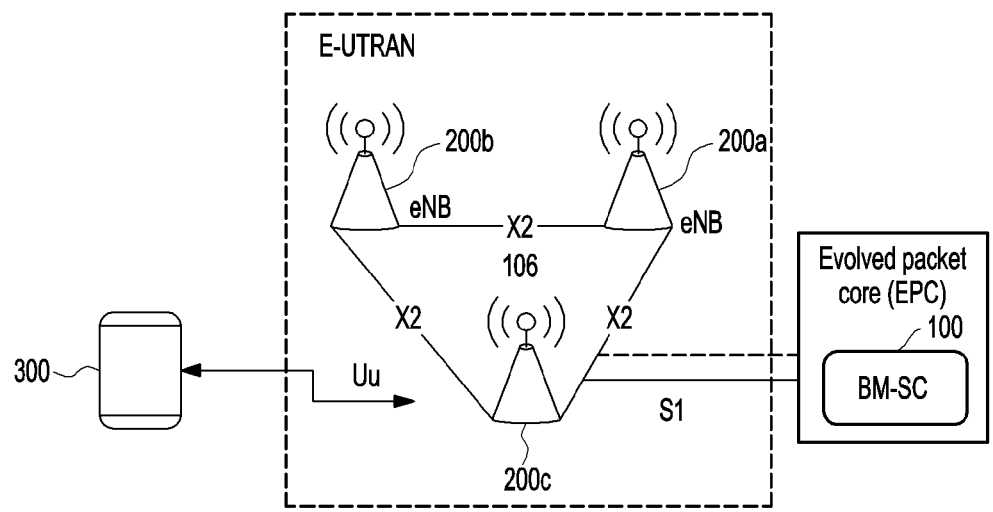

[Fig. 2]
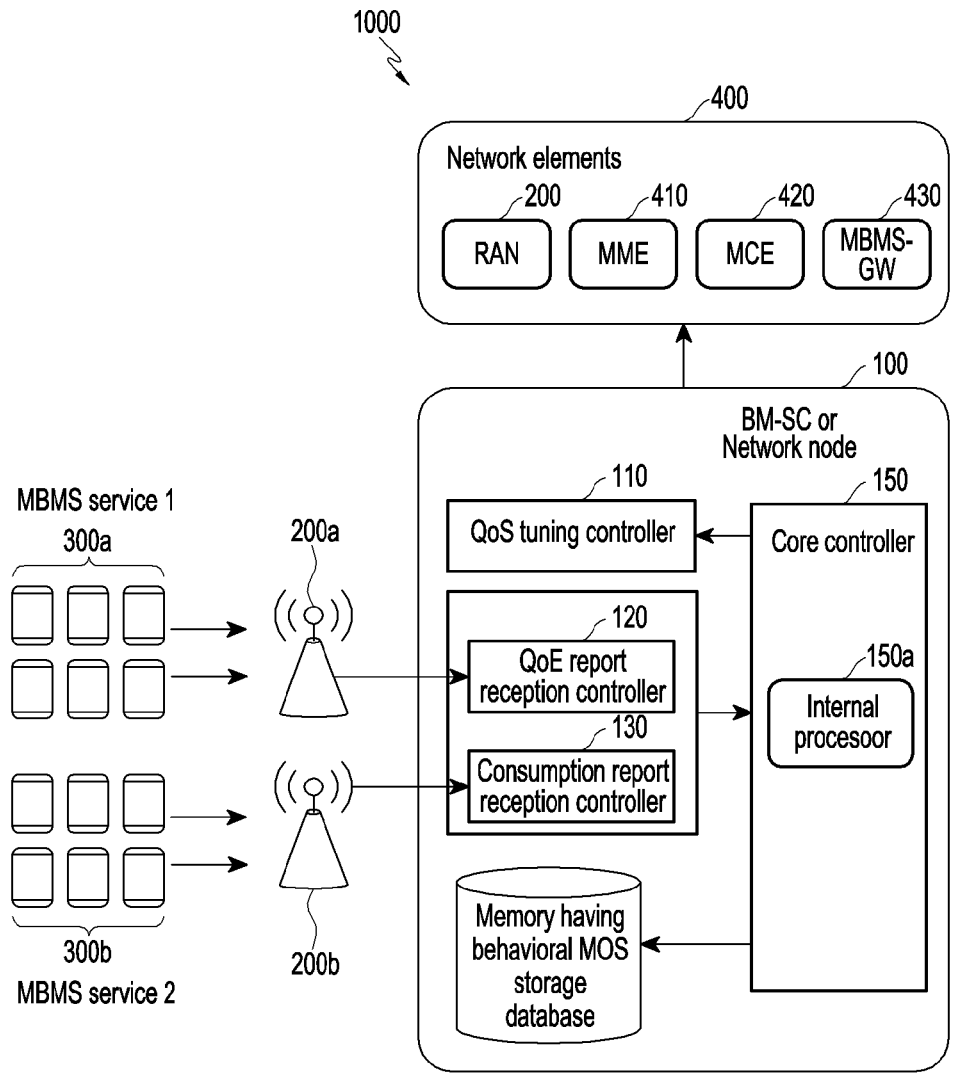
[Fig. 3]
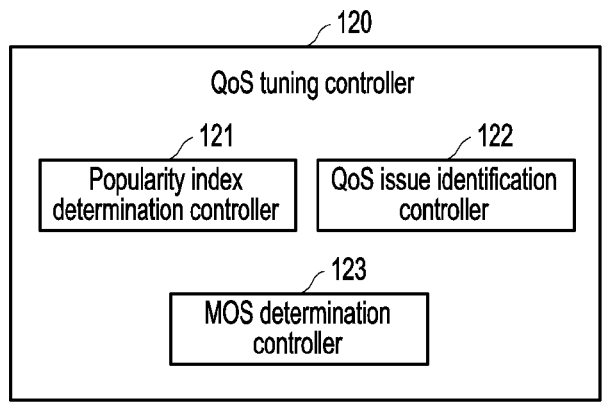

[Fig. 4]
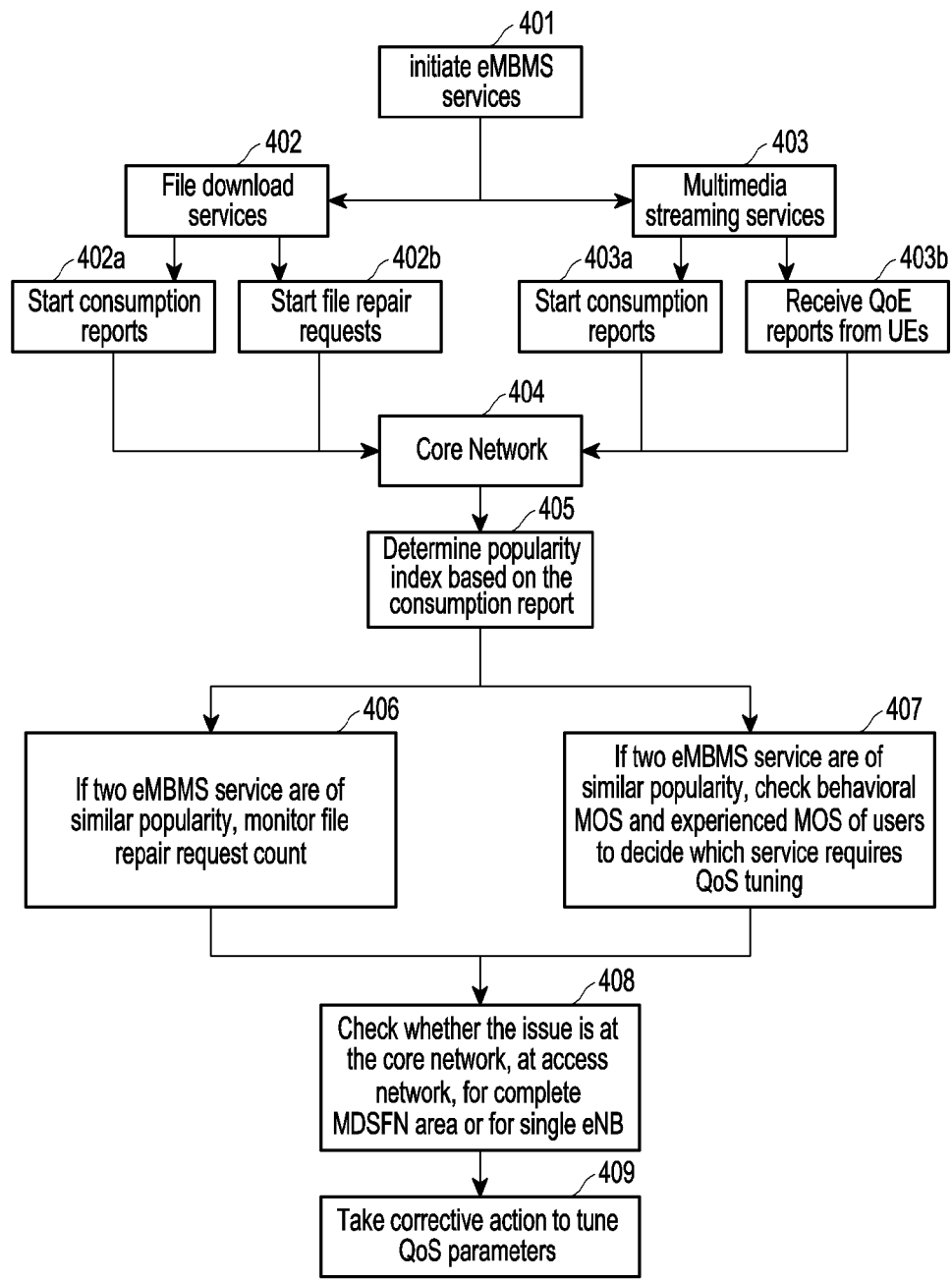

[Fig. 5]
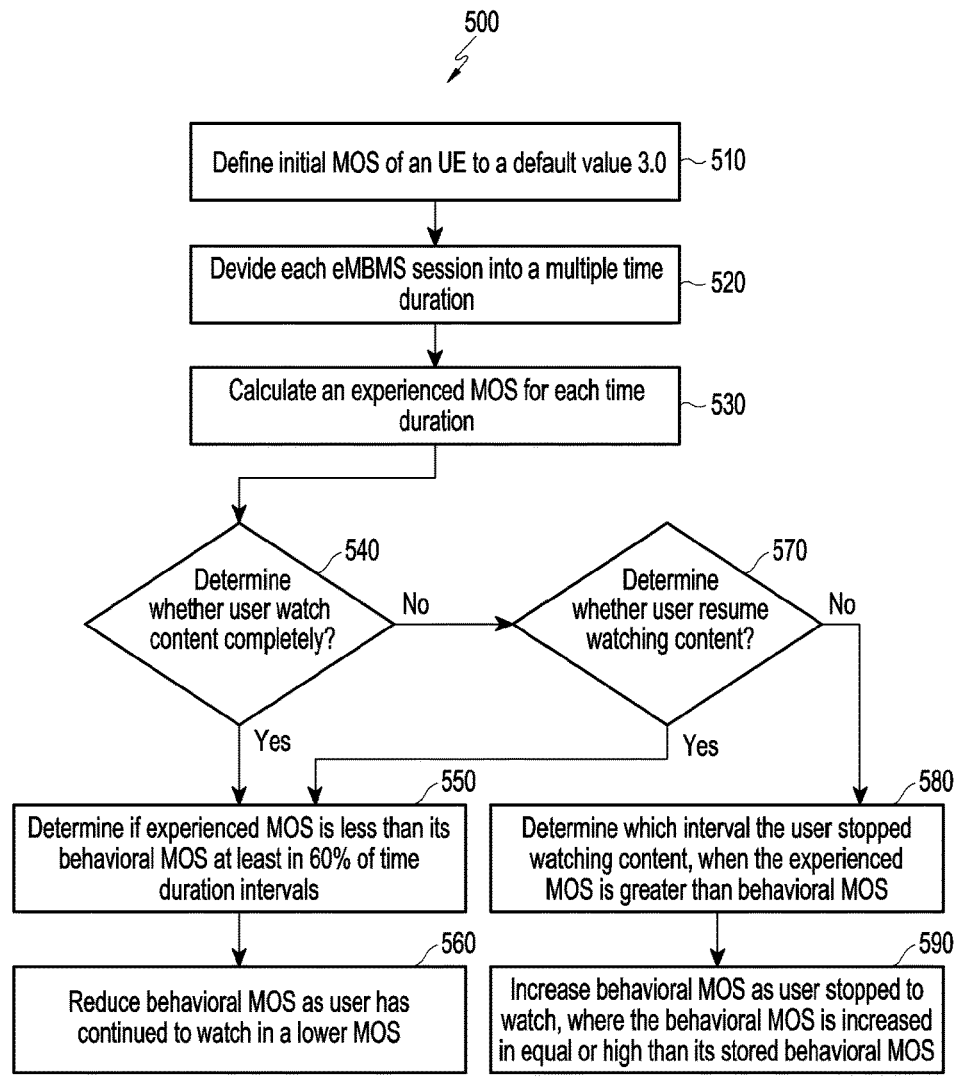
[Fig. 6]
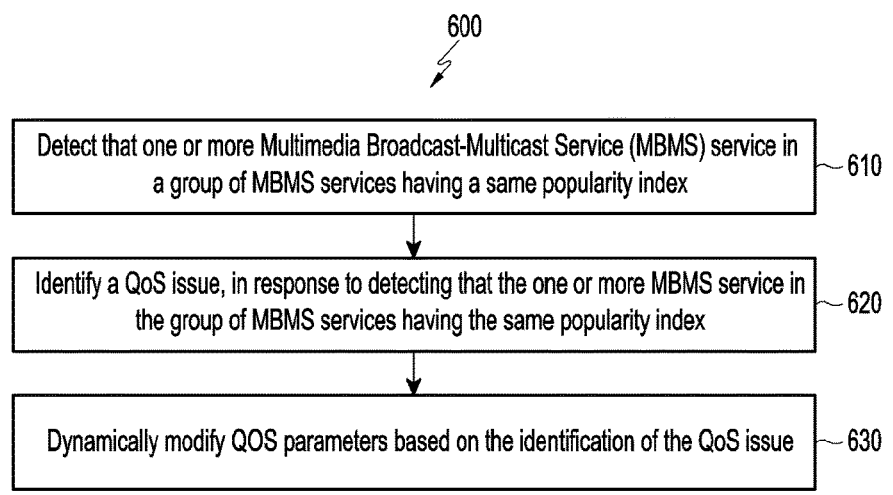

[Fig. 7a]
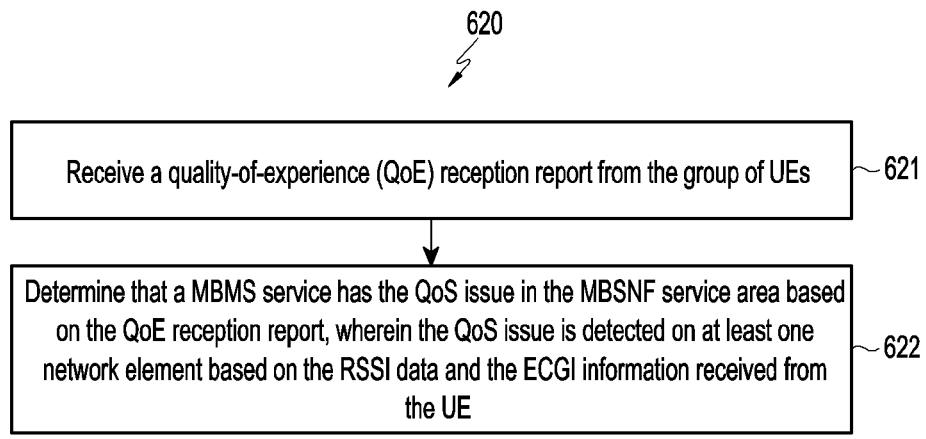
[Fig. 7b]
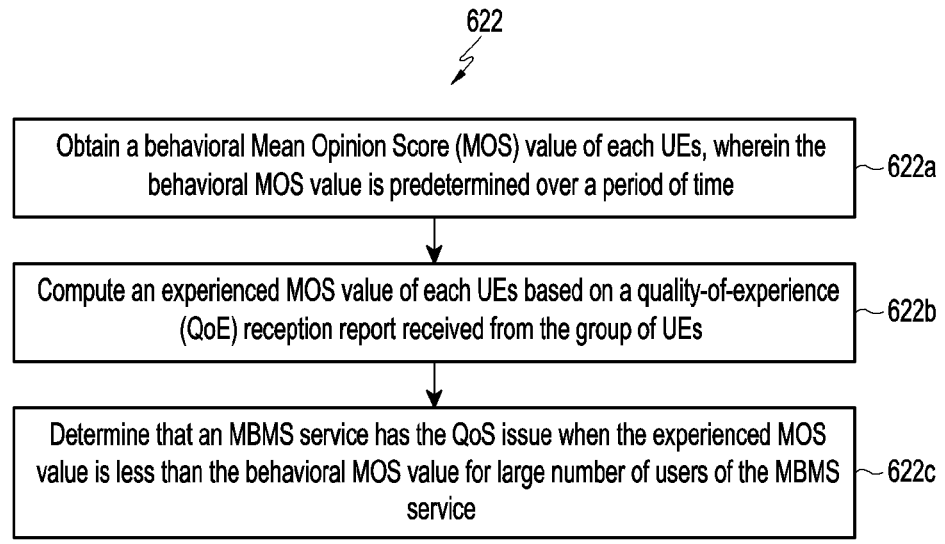

[Fig. 8]
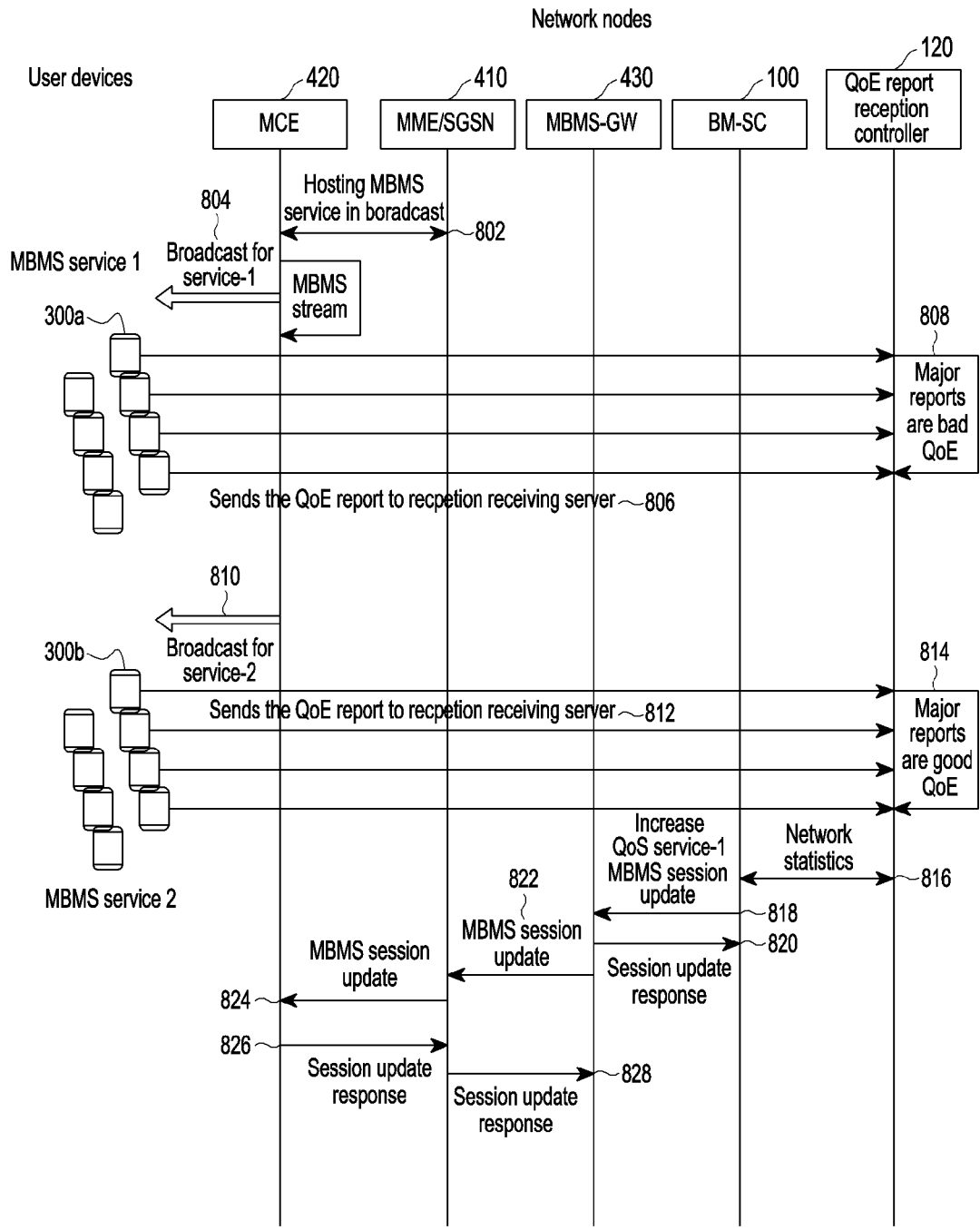

[Fig. 9]
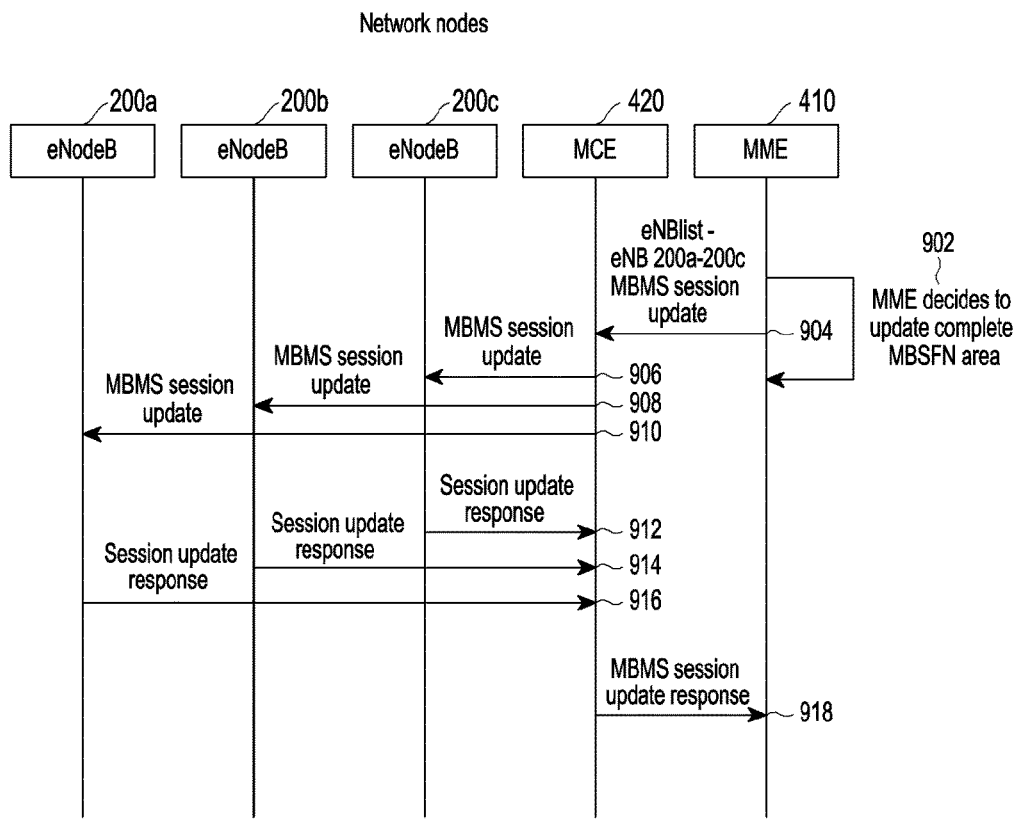
[Fig. 10]
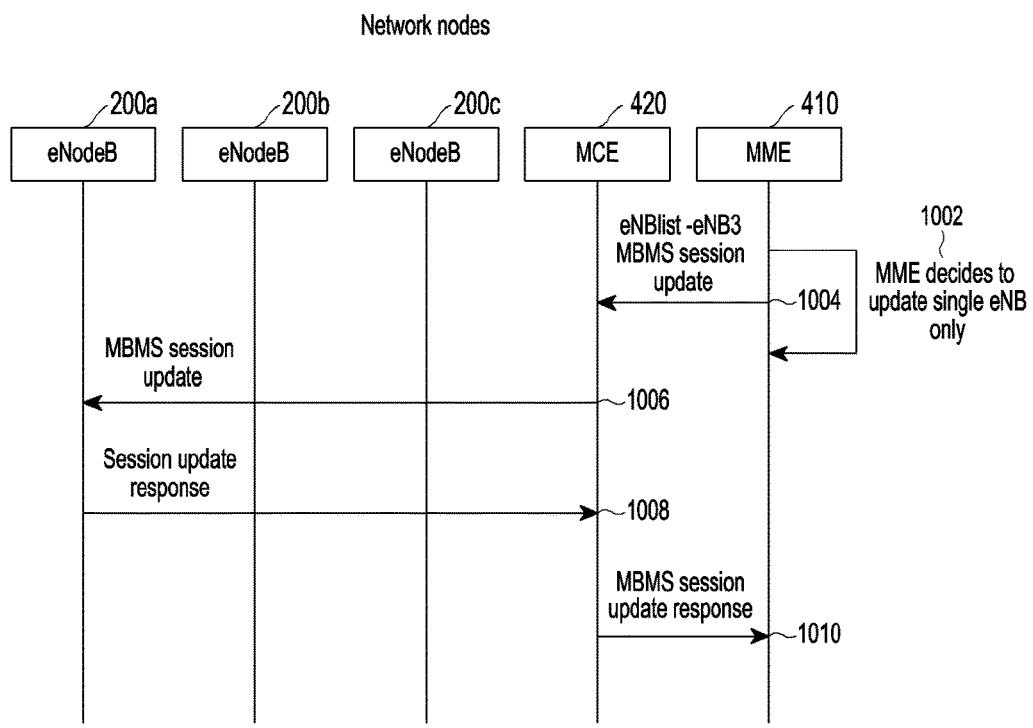

[Fig. 11]
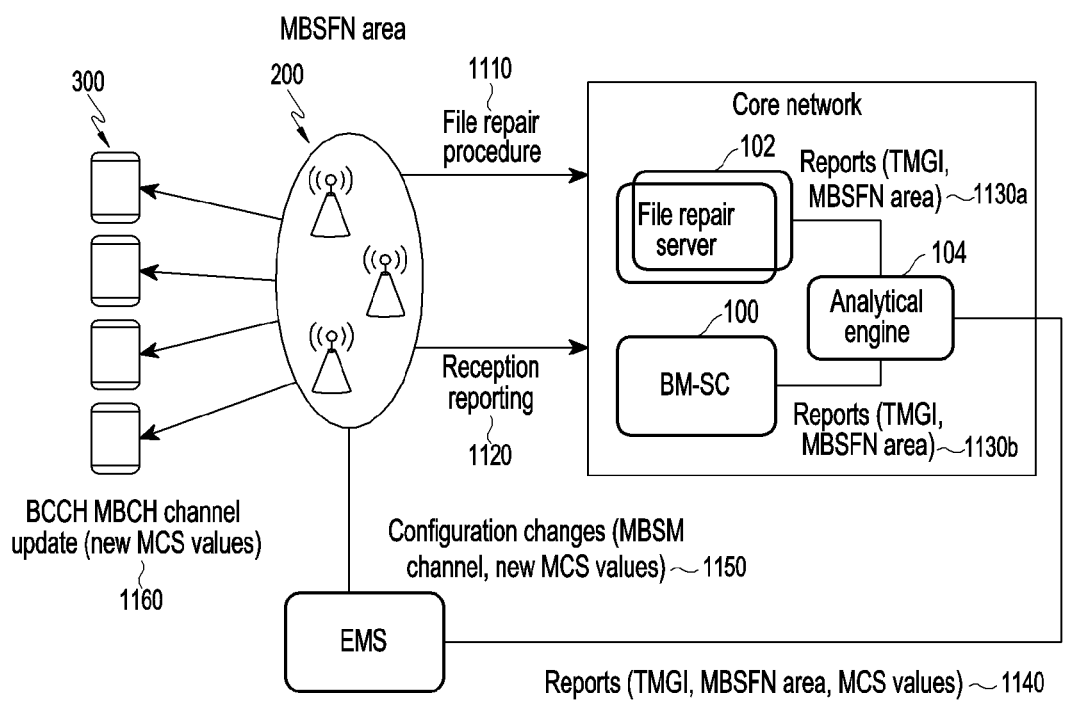

METHOD AND SYSTEM FOR MANAGING QUALITY OF SERVICE OF EVOLVED MULTIMEDIA BROADCAST MULTICAST SERVICE (EMBMS) SERVICE

CROSS-REFERENCE TO RELATED APPLICATION(S)

This application is a National Phase Entry of PCT International Application number PCT/KR2018/014033, which was filed on Nov. 15, 2018, and claims priority to Indian Patent Application number 201741041279, which was filed in the Indian Intellectual Property Office on filed on Nov. 17, 2017, and Indian Patent Application number 201741041279, which was filed in the Indian Intellectual Property Office on filed on Sep. 5, 2018 the entire disclosure of each of these applications is incorporated herein by reference.

TECHNICAL FIELD

This disclosure relates to a wireless communication system, and more particularly relates to a method, apparatus and system for managing Quality of Service (QoS) of Evolved Multimedia Broadcast Multicast Service (eMBMS) service in the wireless communication system.

BACKGROUND ART

Multimedia Broadcast Multicast Service (MBMS) are a point-to-multipoint interface specification for Third Generation Partnership Project (3GPP) cellular networks. The MBMS is designed to provide efficient delivery of broadcast and multicast services, both within a cell as well as within a core network. The specification is referred to as Evolved Multimedia Broadcast Multicast Service (eMBMS), when transmissions are delivered through a Long-Term Evolution (LTE) network. The eMBMS is also known as LTE Broadcast.

FIG. 1a is an example illustration of the eMBMS session in a wireless communication system, according to a prior art. As shown in the FIG. 1a, initially a service provider (not shown) can configure Quality of Service (QoS) parameters for eMBMS service-1 and eMBMS service-2 in a Multimedia Broadcast Single Frequency network (MBSFN) service area. Based on service provider settings, the Broadcast Multicast Service Center (BM-SC) 100 can decide the QoS parameters applicable for the eMBMS service. Further, the BM-SC 100 assigns the QoS parameters to all network elements in the eMBMS session. Further, the QoS parameters are retained throughout the eMBMS session, some of the eMBMS service may experience a poor QoS. For e.g., consider the eMBMS service-2 is a more popular service in the MBSFN service area, then User Equipment's (320a-320c) utilizing the eMBMS service-2 may face the poor QoS due to more number of users. As the BM-SC 100 is not aware that some of the eMBMS service are experiencing bad QoS, the user of a User Equipment (UE) 300 may experience the bad Quality of Experience (QoE) while watching a multimedia content.

In conventional methods, as per the 3GPP specification, the BM-SC 100 is configured to tune the QoS parameters at a run time of the eMBMS service in the eMBMS session. However, the conventional method can be used for tuning the QoS parameters in a network from end to end i.e., the BM-SC 100 can tune the QoS parameters for all network elements responsible for the eMBMS service. FIG. 1b is an example illustration of tuning QoS parameters in the eMBMS session, according to a prior art. As shown in the FIG. 1b, the conventional method does not determine whether an issue (i.e., bad QoS) is at the core network, an access network, the MBSFN area, or an evolved NodeB (eNB) 200a associated with the MBSFN area. The BM-SC 100 can tune the QoS parameters for all network elements in the MBSFN area. Hence, the conventional system does not detect a point of issue in the eMBMS session.

Thus, it is desired to address the above mentioned disadvantages or other shortcomings or at least provide a useful alternative.

DISCLOSURE OF INVENTION

Technical Problem

An aspect of the disclosure is to provide a method and system for managing QoS of an eMBMS service in a wireless communication system.

Another aspect of the disclosure is to detect that more than one MBMS services in a group of MBMS services have a similar popularity index.

Another aspect of the disclosure is to identify a QoS issue in one or more MBMS service, in response to detecting that the more than one MBMS services in the group of MBMS services have the similar popularity index.

Another aspect of the disclosure is to dynamically modify QOS parameters based on the identification of the QoS issue.

Another aspect of the disclosure is to detect that the QoS issue is from at least one network elements.

Another aspect of the disclosure is to determine the popularity index of the MBMS service based on the consumption report.

Another aspect of the disclosure herein is to determine that the MBMS service has the QoS issue in a MBSFN service area based on a QoE reception report.

Another aspect of the disclosure is to compute an experienced Mean Opinion Score (MOS) of each UEs based on the QoE reception report received from the group of UEs.

Another aspect of the disclosure is to determine that the MBMS service has the QoS issue for a user, when the experienced MOS is less than the behavioral MOS.

Solution to Problem

Accordingly the embodiments herein provide a method for managing QoS of an eMBMS service in wireless communication system. The method includes detecting, by a network node, more than one MBMS services in a group of MBMS services have a similar popularity index. Further, the method includes identifying, by the network node, a QoS issue in one or more MBMS service, in response to detecting that the more than one MBMS service in the group of MBMS services have the similar popularity index. Furthermore, the method includes dynamically modifying, by the network node, QOS parameters based on the identification of the QoS issue.

In an embodiment, identifying the QoS issue includes detecting the QoS issue from entire core network, or entire access network, or one eNodeB from a Multicast Broadcast Single Frequency Network MBSFN area or complete MBSFN area at least one network elements, where the network elements can be at least one of a node from at least one of a core network and an access network, and a complete MBSFN service area. Further, the method includes identifying the QoS issue based on the detecting the QoS issue from at least one network elements.

In an embodiment, determining the popularity index of the MBMS service includes receiving a consumption report from a group of User Equipments (UEs) associated with the group of MBMS services in an MBSFN service area. Further, the method includes determining the popularity index of the MBMS service based on the consumption report.

In an embodiment, the consumption report includes Received Signal Strength Indication (RSSI) data and an Evolved Universal Terrestrial Radio Access (E-UTRAN) Cell Global Identifier (ECGI) information.

In an embodiment, identifying the QoS issue includes receiving a QoE reception report from the group of UEs. Further, the method includes determining that a MBMS service has the QoS issue in the MBSFN service area based on the QoE reception report, where the QoS issue is detected on at least one network element for at least one eMBMS service based on the RSSI data and the ECGI information received from the UE.

In an embodiment, determining that the MBMS service has the QoS issue in the MBSFN service area based on the QoE reception report includes obtaining a MOS of each UEs, where the behavioral MOS is assigned with a predetermined value and the behavioral MOS is updated based on a user behavior over a period of time. Further, the method includes computing an experienced MOS of each UEs based on a QoE reception report received from the group of UEs. Furthermore, the method includes determining that the MBMS service has the QoS issue when the experienced MOS is less than the behavioral MOS.

In an embodiment, the method further includes dynamically modifying the behavioral MOS in response to the user behavior, where modifying the behavioral MOS is based on the user start of viewing the MBMS content, stop of viewing the eMBMS content or resuming the MBMS content viewing.

Accordingly the embodiments herein provide a network node for managing QoS of an eMBMS service in wireless communication system. The network node includes a QoS tuning controller configured to detect that more than one MBMS service in a group of MBMS services have a similar popularity index. Further, the QoS tuning controller is configured to identify a QoS issue in one or more MBMS service, in response to detecting that the more than one MBMS service in the group of MBMS services have the similar popularity index, wherein one of the eMBMS service is having many users whose experienced MOS is less than their behavioral MOS. Furthermore, the QoS tuning controller is configured to dynamically modify QoS parameters based on the identification of the QoS issue.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

This method is illustrated in the accompanying drawings, throughout which like reference letters indicate corresponding parts in the various figures. The embodiments herein will be better understood from the following description with reference to the drawings, in which:

FIG. 1a is an example illustration of an Evolved Multimedia Broadcast Multicast Service (eMBMS) session in a wireless communication system, according to a prior art;

FIG. 1b is an example illustration of tuning QoS parameters in the eMBMS session, according to a prior art;

FIG. 2 is an architecture diagram of a network node for tuning the QoS parameters for the eMBMS session in the wireless communication system, according to an embodiment as disclosed herein;

FIG. 3 is a block diagram of a QoS tuning controller of the network node, according to an embodiment as disclosed herein;

FIG. 4 is a process flow diagram illustrating a method for tuning the QoS parameters for the eMBMS session in the wireless communication system, according to an embodiment as disclosed herein;

FIG. 5 is a flow diagram illustrating various operations for tuning a behavioral MOS of an User Equipment (UE), according to an embodiment as disclosed herein;

FIG. 6 is a flow diagram illustrating various operations for managing the QoS for the UEs in the wireless communication system, according to an embodiment as disclosed herein;

FIG. 7a is a flow diagram illustrating various operations for determining a QoS issue in the eMBMS session, according to an embodiment as disclosed herein;

FIG. 7b is a flow diagram illustrating various operations for determining the QoS issue in the eMBMS session, according to an embodiment as disclosed herein;

FIG. 8 is a sequence diagram illustrating various operations for modifying the QoS parameters at a core network, according to an embodiment as disclosed herein;

FIG. 9 is a sequence diagram illustrating various operations for modifying the QoS parameters of a MBSFN area, according to an embodiment as disclosed herein;

FIG. 10 is a sequence diagram illustrating various operations for modifying the QoS parameters of a base station in the MBSFN area, according to an embodiment as disclosed herein; and FIG. 11 is a block diagram illustrating various operations for modifying the QoS parameters of an access network associated with the UE, according to an embodiment as disclosed herein.

MODE FOR THE INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, storage circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Embodiments herein provide a method for managing Quality of Service (QoS) of an Evolved Multimedia Broadcast Multicast Service (eMBMS) service in a wireless communication system. The method includes detecting, by a network node, more than one Multimedia Broadcast-Multicast Service (MBMS) services in a group of MBMS services have a similar popularity index. Further, the method includes identifying, by the network node, a QoS issue, in response to detecting that the more than one MBMS service in the group of MBMS services have the similar popularity index. Furthermore, the method includes dynamically modifying, by the network node, QoS parameters based on the identification of the QoS issue for at least one eMBMS service.

In the conventional methods, the network node in the wireless communication system maintains QoS parameters throughout an entire eMBMS session as defined by a service provider. This results in static way of configuring the QoS parameters to a User Equipment (UE). Further, if the MBMS service is more popular then, there will be more number of users to access the MBMS service, results in more number of users are facing a poor QoS. Hence, there exists a likelihood for the more number of users to leave from the eMBMS service due to the poor QoS.

Unlike conventional methods and systems, the proposed method can be used to monitor a popularity index of the eMBMS service and tune the QoS parameters based on the popularity index.

In the conventional methods, the wireless communication system tunes the QoS parameters of all network elements involved in the eMBMS session, as the wireless communication system does not aware that where exactly the QoS issue is occurred.

Unlike conventional methods and systems, the proposed method can be used to identify whether the QoS issue is at the core network, at the access network, a MBSFN area or the single evolved NodeB (eNB) of the MBSFN area based on the popularity index and a MOS. Based on the determination, the proposed method can be used to tune the QoS parameters, which increases the user experience of using the MBMS service.

Referring now to the drawings, and more particularly to FIG. 2 to FIG. 10, there are shown preferred embodiments.

FIG. 2 is an architecture diagram of a network node 100 for tuning the QoS parameters for the eMBMS session in the wireless communication system 1000, according to an embodiment as disclosed herein. The wireless communication system 1000 includes a plurality of UEs (300a-300b) which are accessing the MBMS service 1 and the MBMS service 2 in a MBSFN service area. The wireless communication system 1000 includes the network node 100 for managing the QoS of the eMBMS session. In an embodiment, the network node 100 can be a Broadcast Multicast Service Centre (BM-SC) 100. The network node 100 can be a core controller in the wireless communication system 1000. Further, the wireless communication system 1000 includes MBMS related network elements such as Random Access Network (RAN) node 200, a Mobility Management Entity (MME) 410, a Multicast Coordination Entity (MCE) 420, and an MBMS Gateway (MBMS GW) 430.

In general, the QoS is a measurement of the overall performance of a service, such as a multimedia service, telephony, computer network or the like. In an embodiment, the QoS is the overall performance observed by the users in the MBSFN service area of the network. Further, the QoS is determined based on at least one QoS parameters such as higher popularity index of the MBMS service, packet loss, bit rate, throughput, transmission delay, jitter, or the like. A QoS issue is identified based on a bad/low QoS value. The bad QoS may be indicated by, for example, one or more QoS parameters falling above or below a predetermined threshold. In an instance, the QoS issue is identified based on a failover connection associated with an eMBMS service such as disconnection of the eMBMS service, reconnection of the eMBMS service, failure of the eMBMS service, or the like.

The BM-SC 100 serves as a network element for starting MBMS service (Session Start), stopping MBMS service (Session Stop), updating MBMS service (Session Updated) or supplying MBMS service data. The MBMS GW 430 transmits the MBMS service data to a corresponding RAN node 200 (such as eNB 200a or eNB 200b) via an M1 interface. Further, the MBMS GW 430 transmits a control plane information for e.g., Session Start message, Session Stop message, Session Updated message generated by the BM-SC 100, to the MME 410 via a Sm interface. The BM-SC 100 serves as an entry point for a service provider of MBMS transmissions, and the BM-SC 100 can be used to authorize and initiate MBMS Bearer Services in the wireless communication system 1000.

The MME 410 serves as a forwarding network element to forward the control plane information received from the MBMS GW 430 to the MCE 420 via an M3 interface. The MCE 420 transmits corresponding control plane information to a corresponding eNB. With such processing, the eNB (200a-200b, herein after referred as 200) can acquire the MBMS service data and the corresponding control plane information.

Further, the eNB 200 transmits the MBMS service to the corresponding UEs 300. In an example, the eNB 200a can transmit the MBMS service to the plurality of UE 300a and the eNB 200b can transmit the MBMS service to the plurality of UE 300b. The UE 300 can be for example a cellular telephone, a smartphone, a personal computer (PC), a minicomputer, a desktop, a laptop, a handheld computer, a Personal Digital Assistant (PDA), or the like. The UE 200 may support multiple Radio access technologies (RAT) such as, for e.g., Code-division multiple access (CDMA), General Packet Radio Service (GPRS), Evolution-Data Optimized EVDO (EvDO), Time-division multiple access (TDMA), Global System for Mobile Communications (GSM), Worldwide Interoperability for Microwave Access (WiMAX) technology, LTE, LTE Advanced and 5G communication technologies.

In an embodiment, the BM-SC 100 includes a QoS tuning controller 110, a QoE report reception controller 120, a consumption report reception controller 130, a memory having behavioral MOS storage database 140 and a core controller 150 includes an internal processor 150a.

The memory 140 can be configured to store the behavioral MOS for each UEs 300 in the MBSFN area.

In an embodiment, the QoS tuning controller 110 detects that more than one MBMS services in a group of MBMS services have a similar popularity index. In an embodiment, the consumption report reception controller 130 is configured to determine the popularity index of the MBMS service. The consumption report reception controller 130 receives a consumption report from a group of UEs 300 associated with the group of MBMS services in a Multicast Broadcast Single Frequency Network (MBSFN) service area. As shown in the FIG. 2, the UE 300a associated with the MBMS service-1 configured to send the consumption report to the consumption report reception controller 130 and the UE 300b associated with the MBMS service-2 configured to send the consumption report to the consumption report reception controller 130. The consumption report includes a Received Signal Strength Indication (RSSI) data and an E-UTRAN Cell Global Identifier (ECGI) information. Based on the consumption report from the UE 200, the consumption report reception controller 130 is configured to determine the popularity index of each of the MBMS service in the group of MBMS services.

In an embodiment, the core network defines a configurable timing duration parameter for UEs 300, while sending User Service Description (USD) file to the UEs 300 regarding the eMBMS service. Accordingly, the UEs 300 sends the consumption report based on the configured timing duration. The consumption report includes a service ID, a consumption type, an identity of the UE 300, a report time, the RSSI, and a location attribute. The service ID indicates the eMBMS service on which user is viewing, and the consumption type indicates the state of the eMBMS service. The report time indicates the time of generation of report by the UE 300 and the location attribute indicates the ECGI information which is used for identifying on which eNB 200 the UE is connected.

Further, the QoS tuning controller 110 identifies a QoS issue, in response to detecting that the more than one MBMS service in the group of MBMS services have the similar popularity index. If more than one MBMS service in the group of MBMS services have the similar popularity index then, the QoS tuning controller 110 performs comparison of a behavioral MOS and an experienced MOS of multiple UEs 300 to decide which MBMS service requires QoS tuning. If one MBMS service has high number of users which are experiencing poor QoE using above comparison then the MBMS service is chosen for the QoS tuning. The QoS tuning controller 110 obtains the behavioral MOS of each UEs 300, where the behavioral MOS is predetermined over a period of time. The behavioral MOS is calculated from a past activities of UEs 300, where the behavioral MOS is a MOS in which the user of the UE 300 will likely to continue watching the multimedia content.

In an embodiment, the experienced MOS is calculated from the QoE parameters received from a QoE report reception controller 120. The QoE report reception controller 120 receives a Quality-of-Experience (QoE) reception report from the group of UEs 300. The QoE parameters can be a re-buffering duration metric and an initial-buffering duration metric. As shown in the FIG. 2, the UE 300a associated with the MBMS service-1 sends QoE reception report to the QoE report reception controller 120 and the UE 300b associated with the MBMS service-2 sends QoE reception report to the QoE report reception controller 120.

The QoE reception report can include QoE parameters experience by the UE 300 at a run time. The QoE parameters can include an initial Re-buffering Duration (Lti), a re-buffering Frequency (Lfr) and a mean Re-buffering time (Ltr). The QoE parameters can be used for segregating which MBSFN areas are experiencing the poor QoS. Further, it brings in the application of calculation a behavioral MOS (Mean Opinion score) and an experienced MOS for finding out the MBSFN area which needs the tuning of QoS parameters.

In an embodiment, the proposed method can be used to calculate the experienced MOS using, but not limited to, a linear regression technique.

The experienced MOS can be calculated by applying linear regression techniques to QoE parameters such as an initial Re-buffering Duration (Lti), a re-buffering Frequency (Lfr) and a mean Re-buffering time (Ltr). The QoE is determined based on a quality of content perceived by user.

TABLE 1

Comparison of MOS and the QoE of the MBMS service

| MOS | QoE | Impairment |
| --- | --- | --- |
| >4 | Excellent | Imperceptible |
| 3-4 | Good | Perceptible but not annoying |
| 2-3 | Fair | Slightly annoying |
| 1-2 | Poor | Annoying |
| 0-1 | Bad | Very annoying |

Based on the table 1, it is observed that the QoS of the MBMS service is high when the MOS is high. In an embodiment, the core controller 150 identifies whether the QoS issue is from which network element 400 based on the consumption report such as the RSSI data and the ECGI information received from the UE 300. The internal processor 150 can process the consumption report, QoE report to determine the QoS issue. Based on processing the MOS and the consumption report, the core controller 150 identifies the QoS issue in the network element 400. The core controller 150 determines that where exactly the QoS issue is detected in the eMBMS session establishment.

TABLE 2

Comparison of Behavioral MOS and Experienced MOS: MOS comparison

| | Behavioral MOS | Experienced MOS |
| --- | --- | --- |
| Service-1 | | |
| User 1 | 2 | 4 |
| User 2 | 3 | 5 |
| User 3 | 2 | 5 |
| User 4 | 2 | 4 |

TABLE 2-continued

Comparison of Behavioral MOS and Experienced MOS: MOS comparison

|  | Behavioral MOS | Experienced MOS |
|---|---|---|
| Service-2 | | |
| User 1 | 3 | 4 |
| User 2 | 3 | 2 |
| User 3 | 4 | 2 |
| User 4 | 4 | 2 |

Based on the comparison of the behavioral MOS and the Experienced MOS, the core network monitors which MBMS service has more users whose experienced MOS is less than their respective behavioral MOS which can help to decide which MBMS service needs QoS tuning at the core network. In an embodiment, the QoS tuning controller 110 determines that the MBMS service has the QoS issue when the experienced MOS is less than the behavioral MOS. For example, based on the table 2, for all the users of MBMS Service-1, the experienced MOS is higher than the behavioral MOS. That implies that users are satisfied with a service quality. Further, for all the users of MBMS Service-2, the experienced MOS is less than the behavioral MOS. That implies that users are not satisfied with the service quality. Hence, the BM-SC 100 needs to tune the QoS parameters of the MBMS Service-2.

Further, the core controller 150 informs the QoS tuning controller 110 to update the QoS parameters of network elements 400 involved in eMBMS session establishment. Furthermore, the QoS tuning controller 110 dynamically modifies QoS parameters based on the identification of the QoS issue. The QoS parameters can be for example a QoS Class Identifier (QCI), an Allocation and Retention Priority (ARP), a Maximum Bit Rate (MBR), a Guaranteed Bit Rate (GBR) and a Modulation Coding Scheme (MCS).

FIG. 3 is a block diagram of a QoS tuning controller 110 of the network node 100, according to an embodiment as disclosed herein. In an embodiment, the QoS tuning controller 110 includes a popularity index determination controller 121, a QoS issue identification controller 122 and a MOS determination controller 123.

In an embodiment, the popularity index determination controller 121 detects that more than one MBMS services in the group of MBMS services have the similar popularity index. The popularity index determination controller 121 receives the consumption report from the group of UEs 300 associated with the group of MBMS services in the MBSFN service area. Further, the popularity index determination controller 121 determines the popularity index of the MBMS service based on the consumption report.

In an embodiment, the QoS issue identification controller 122 identifies the QoS issue, in response to detecting that the more than one MBMS service in the group of MBMS services have the similar popularity index. The QoS issue identification controller 122 detects the QoS issue from at least one network elements, where the network elements can be at least one of a node from at least one of a core network and an access network, and a complete Multicast Broadcast Single Frequency Network (MBSFN) service area. Further, the QoS issue identification controller 122 identifies the QoS issue based on the detection. In an embodiment, the QoS tuning controller 110 dynamically modifies the QOS parameters based on the identification of the QoS issue.

In an embodiment, the QoS issue identification controller 122 receives the QoE reception report from the group of UEs 300. Further, the QoS issue identification controller 122 determines that the MBMS service has the QoS issue in the MBSFN service area based on the QoE reception report, where the QoS issue is detected on at least one network element based on the RSSI data and the ECGI information received from the UE 300.

In an example, the QoE reception report applicable for a multimedia session based eMBMS service, where the QoE report observed at the UE 300 is indicated in the below Table 3:

TABLE 3

QoE reception report for the eMBMS service

| QoE metric | Streaming delivery method | Download delivery method | Metric type |
|---|---|---|---|
| Corruption duration metric | Yes | — | Media |
| Rebuffering duration metric | Yes | — | Session |
| Initial buffering duration metric | Yes | — | Session |
| Successive loss of RTP packets | Yes | — | Media |
| Frame rate deviation | Yes | — | Media |
| Jitter duration | Yes | — | Media |
| Content access/switch time | Yes | — | Session |
| Network resource | Yes | — | Session |
| Average code bitrate | Yes | Yes | Media |
| Codec information | Yes | — | Media |
| Loss of objects | — | Yes | Session |
| Distribution of symbol count underrun for failed blocks | — | Yes | Session |

In an embodiment, the QoS issue identification controller 122 obtains the behavioral MOS of each UEs 300. Further, the QoS issue identification controller 122 computes the experienced MOS of each UEs based on the QoE reception report received from the group of UEs 300. Further, the QoS issue identification controller 122 determines that the MBMS service has the QoS issue when the experienced MOS is less than the behavioral MOS. In an embodiment, the MOS determination controller 123 dynamically modifies the behavioral MOS based on the user behavior such as start of viewing the eMBMS session, stop of viewing the eMBMS session and resuming the eMBMS session.

FIG. 4 is a process flow diagram illustrating the method for tuning the QoS parameters for the eMBMS session in the wireless communication system 1000, according to an embodiment as disclosed herein.

At step 401, the method includes initiating the eMBMS services. The eMBMS service can be file download services 402 as initiated at step 402 and multimedia streaming services 303 as initiated at step 403.

Further, the method includes receiving consumption reports and file repair requests from the UEs 300 for the file download services 402 at step 402*a*. Further, the method includes receiving consumption reports and QoE reports from the UEs 300 for the multimedia streaming services 303 at step 403*ba*.

The consumption report and the QoE reception report of all UEs 300 are forwarded to the core network at step 404.

Further, the method includes determining the popularity index of the MBMS service-1 and the MBMS service-2 based on the consumption report at step 405.

In an embodiment, the method includes determining whether the two MBMS services in the MBSFN area are of similar popularity. In an embodiment, the BM-SC 100 determines whether the two MBMS services in the MBSFN area are of similar popularity. If the two MBMS services are of similar popularity then, the method includes monitoring file repair request count of the file download service at step 406.

If the two MBMS services are of similar popularity then, the method includes comparing the behavioral MOS and the experienced MOS of multiple UEs 300 to determine which MBMS service requires QoS tuning for the multimedia streaming service at step 407. If one MBMS service has high number of users who are experiencing poor QoE using above comparison are chosen for QoS tuning.

At step 408, the method includes determining whether the QoS issue is at the core network, the access network, the complete MBSFN area or the single eNB. Accordingly, at step 409, the method includes taking corrective action to tune the QoS parameter in the eMBMS session. In an embodiment, the method allows the QoS tuning controller 110 to tune the QoS parameter in the eMBMS session.

FIG. 5 is a flow diagram 500 illustrating various operations for tuning the behavioral MOS of the UE 300, according to an embodiment as disclosed herein.

At 510, the method includes defining an initial behavioral MOS for the UE 300. In an embodiment, the method allows the MOS determination controller 123 to define the initial behavioral MOS to "3.0".

At 520, the method includes dividing each eMBMS session into a multiple time duration. In an embodiment, the method allows the MOS determination controller 123 to divide each eMBMS session into the multiple time duration.

At 530, the method includes calculating the experienced MOS for each time duration. In an embodiment, the method allows the MOS determination controller 123 to calculate the experienced MOS for each time duration.

At 540, the method includes determining whether the user watches the multimedia content completely. In an embodiment, the method allows the MOS determination controller 123 to determine whether the user watches the multimedia content completely.

If the user watches the multimedia content completely then, at step 550, the method includes determining whether the experienced MOS is less than the behavioral MOS for example at least in 60% of time duration intervals. In an embodiment, the method allows the MOS determination controller 123 to determining whether the experienced MOS is less than the behavioral MOS.

Further, at 560, the method includes reducing the behavioral MOS as the user has continued to watch in a lower MOS. In an embodiment, the method allows the MOS determination controller 123 to reduce the behavioral MOS as the user has continued to watch in the lower MOS.

If the user does not watch the multimedia content completely then, at step 570, the method includes determining whether the user resume watching the multimedia content. In an embodiment, the method allows the MOS determination controller 123 to determine whether the user resume watching the multimedia content. If the user resume watching the multimedia content then, at method includes continuing with step 550.

If the user stopped watching the multimedia content then, at step 580, the method includes determining which interval in which the user stopped watching content, when the experienced MOS is greater than behavioral MOS. In an embodiment, the method allows the MOS determination controller 123 to determine which interval in which the user stopped watching content, when the experienced MOS is greater than behavioral MOS.

At step 590, the method includes increasing the behavioral MOS as the user has stopped to watch the multimedia content, where the experienced MOS is increased in equal to or higher than its stored behavioral MOS. In an embodiment, the method allows the MOS determination controller 123 to increase the behavioral MOS as the user has stopped to watch the multimedia content.

FIG. 6 is a flow diagram 600 illustrating various operations for managing the QoS for the UE 300 in wireless communication system 1000, according to an embodiment as disclosed herein.

At 610, the method includes detecting that more than one MBMS service in the group of MBMS services have the similar popularity index. In an embodiment, the method allows the popularity index determination controller 121 to detect that the more than one MBMS service in the group of MBMS services have the similar popularity index.

At 620, the method includes identifying the QoS issue in the one or more MBMS service, in response to detecting that the more than one MBMS service in the group of MBMS services have the similar popularity index. In an embodiment, the method allows the QoS issue identification controller 122 to identify the QoS issue.

At 630, the method includes dynamically modifying the QoS parameters based on the identification of the QoS issue. In an embodiment, the method allows the QoS tuning controller 110 to dynamically modify the QoS parameters based on the identification of the QoS issue.

The various actions, acts, blocks, steps, or the like in the flow diagram 600 may be performed in the order presented, in a different order or simultaneously. Further, in some embodiments, some of the actions, acts, blocks, steps, or the like may be omitted, added, modified, skipped, or the like without departing from the scope of the invention.

FIG. 7a is a flow diagram 620 illustrating various operations for determining QoS issue in the eMBMS session, according to an embodiment as disclosed herein.

At 621, the method includes receiving the QoE reception report from the group of UEs 300. In an embodiment, the method allows the QoE report reception controller 120 to receive the QoE reception report from the group of UEs 300.

At 622, the method includes determining that the MBMS service has the QoS issue in the MBSFN service area based on the QoE reception report. The QoS issue is detected on at least one network element based on the RSSI data and the ECGI information received from the UE 300. In an embodiment, the method allows the QoS issue identification controller 122 to determine that the MBMS service has the QoS issue in the MBSFN service area based on the QoE reception report.

The various actions, acts, blocks, steps, or the like in the flow diagram 620 may be performed in the order presented, in a different order or simultaneously. Further, in some embodiments, some of the actions, acts, blocks, steps, or the like may be omitted, added, modified, skipped, or the like without departing from the scope of the invention.

FIG. 7b is a flow diagram 620 illustrating various operations for determining QoS issue in the eMBMS session, according to an embodiment as disclosed herein.

At 622a, the method includes obtaining the behavioral Mean Opinion Score (MOS) of each UEs, where the behavioral MOS is predetermined over the period of time. In an embodiment, the method allows the MOS determination controller 123 to obtain the behavioral MOS of each UEs from the behavioral MOS storage database 150.

At 622b, the method includes computing the experienced MOS of each UEs based on the QoE reception report received from the group of UEs 300. In an embodiment, the method allows the MOS determination controller 123 to compute the experienced MOS of each UEs based on the QoE reception report received from the group of UEs 300.

At 622c, the method includes determining that the MBMS service has the QoS issue when the experienced MOS is less than the behavioral MOS. In an embodiment, the method allows the MOS determination controller 123 to determine that the MBMS service has the QoS issue when the experienced MOS is less than the behavioral MOS.

The various actions, acts, blocks, steps, or the like in the flow diagram 622 may be performed in the order presented, in a different order or simultaneously. Further, in some embodiments, some of the actions, acts, blocks, steps, or the like may be omitted, added, modified, skipped, or the like without departing from the scope of the invention.

FIG. 8 is a sequence diagram illustrating various operations for modifying the QoS parameters at the core network, according to an embodiment as disclosed herein. At step 802, the MME 410 hosts the MBMS service via a broadcast message. In response to the broadcast message from the MME 410, the MCE 420 broadcasts a MBMS stream for the MBMS service-1 at step 804. The UEs 300 in the MBSFN area receives the MBMS stream. At step 806, the UEs 300 sends the QoE report to the QoE report reception controller 120. Consider that the major QoE reports from the UEs 300 having bad QoS at step 808.

Likewise at step 810, the MCE 420 broadcasts the MBMS stream for the MBMS service-2. The UEs 300 in the MB SFN area receives the MBMS stream. At step 812, the UEs 300 send the QoE report to the QoE report reception controller 120. Consider that the major QoE reports from the UEs 300 having good QoS at step 814. Further, the QoE report reception controller 120 transmits network statistics to the BM-SC 100 at step 816.

The BM-SC 100 determines that there is the QoS issue at the MBMS service-1 based on the network statistics from the QoE report reception controller 120. In response to the identification, the BM-SC 100 increases the QoS for the MBMS service-1 by sending the MBMS session update message to the MBMS-GW 430 at step 818.

After receiving the MBMS session update message, the MBMS-GW 430 transmits an acknowledgment such as a session update response message to the BM-SC 100 at step 820. Further, the MBMS-GW 430 transmits the MBMS session update message to the MME/SGSN 410 at step 822. The MME/SGSN 410 transmits the MBMS session update message to the MCE 420 at step 824. After receiving the MBMS session update message, the MCE 420 transmits the acknowledgment such as the session update response message to the MME/SGSN 410 at step 826. Further, the session update response message is forwarded to the MBMS-GW 430 at step 828.

FIG. 9 is a sequence diagram illustrating various operations for modifying the QoS parameters of the MBSFN area, according to an embodiment as disclosed herein. The proposed method can be used to update the QoS parameters at the MBSFN area. In an embodiment, the MME 410 decides to update the QoS parameters for the complete MB SFN area at 902.

At step 904, the MME 410 sends the MBMS session update message to the MCE 420. In response to receiving the MBMS session update message, the MCE 420 updates the QoS parameters by forwarding the MBMS session update to the list of eNB 200 at step 906-910. In response to receiving the MBMS session update message, the eNB 200a sends the session update response message to the MCE 420 at 912. Likewise, the eNB 200b sends the session update response message to the MCE 420 at 914 and the eNB 200c sends the session update response message to the MCE 420 at 916.

Further, the MCE 420 transmits the MBMS session update response message to the MME 410 at step 918. The MME 410 configures the QoS parameters to the complete MBSFN area based on identifying the QoS issue.

FIG. 10 is a sequence diagram illustrating various operations for modifying the QoS parameters of the base station 200a in the MBSFN area, according to an embodiment as disclosed herein. The BS 200 can be for example but not limited to a next Generation NodeB (gNB), eNB, New Radio (NR), and the like. The proposed method can be used to update the QoS parameters for one eNB 200a in the MBSFN area. In an embodiment, the MME 410 decides to update the QoS parameters for the eNB 200a in the complete MBSFN area at 1002.

At step 1004, the MME 410 sends the MBMS session update message to the MCE 420. In response to receiving the MBMS session update message, the MCE 420 updates the QoS parameters by forwarding the MBMS session update to only the eNB 200a from the list of eNB 200 at step 1006. In response to receiving the MBMS session update message, the eNB 200a sends the session update response message to the MCE 420 at 1008.

Further, the MCE 420 transmits the MBMS session update response message to the MME 410 at step 1010. The MME 410 configures the QoS parameters of the eNB 200a in the MBSFN area based on identifying the QoS issue.

FIG. 11 is a sequence diagram illustrating various operations for modifying the QoS parameters of the access network associated with the UE, according to an embodiment as disclosed herein. The proposed method can be used to update the QoS parameters at the access network.

At step 1110, the eNB 200 performs the file repair procedure and transmits the file repair count to the file repair server 102. Further, at 1130a, the file repair server 102 transmits the Temporary Mobile Group Identity (TMGI) for the MBSFN area to an analytical engine 104. The file repair procedures share their statistics about the unicast repair actions taken for the MBMS services to the BM-SC 100 to determine which services are facing issues with the bad QoS.

At step 1120, the eNB 200 transmits the QoE report to the BM-SC 100. Further, the BM-SC 100 forwards the QoE report to the analytical engine 104 at 1130b. At 1140, the analytical engine 104 forwards the report including the TMGI to an Element Management System (EMS). The EMS is the network element that may include one or more systems and/or applications for managing network elements (e.g., eNBs 300) in the wireless communications system 1000. In an embodiment, the analytical engine 104 analyzes the file repair requests received and determine whether a particular eMBMS service is experiencing the bad QoS.

The EMB can send the configuration changes (MBMS channel, new MCS values) to the eNB 200 at step 1150. The eNB 200 can update the Broadcast Control Channel (BCCH) with the updated/new MCS values at step 1160. The Broadcast Control Channel (BCCH) is a logical broadcast channel used by the eNB 200 to send information about the identity of the network. This information is used by the UE 300 to get access to the network. The UE 300 can update the BCCH MBCH channel with the updated/new MCS values at step 1160.

The embodiments disclosed herein can be implemented through at least one software program running on at least one hardware device and performing network management functions to control the elements. The elements shown in the FIGS. 2 through 11 include blocks which can be at least one of a hardware device, or a combination of hardware device and software module.

The foregoing description of the specific embodiments will so fully reveal the general nature of the embodiments herein that others can, by applying current knowledge, readily modify or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for managing quality of service (QoS) of an evolved multimedia broadcast multicast service (eMBMS) service in a wireless communication system, the method comprising:
   detecting, by a core network node, that more than one multimedia broadcast-multicast service (MBMS) services in a group of MBMS services have a similar popularity index;
   identifying, by the core network node, at least one network element with a QoS issue among network elements, in response to detecting that the more than one MBMS services in the group of MBMS services have the similar popularity index, wherein the network elements include the core network node, an access network node, a single evolved nodeB (eNB), and a complete multicast broadcast single frequency network (MBSFN) service area; and
   modifying, by the core network node, QoS parameters of the at least one network element with the QoS issue.

2. The method of claim 1, wherein detecting that the more than one MBMS services in the group of MBMS services have the similar popularity index comprises:
   receiving a consumption report from a group of user equipments (UEs) associated with the group of MBMS services in the MBSFN service area; and
   determining the similar popularity index in the group of MBMS services based on the consumption report.

3. The method of claim 2, wherein the consumption report comprises at least one of received signal strength indication (RSSI) data and evolved-universal mobile telecommunications system (UMTS) terrestrial radio access network (E-UTRAN) cell global identifier (ECGI) information.

4. The method of claim 1, wherein identifying the at least one network element with the QoS issue comprises:
   receiving a quality-of-experience (QoE) reception report from a group of user equipments (UEs); and
   determining that an MBMS service has the QoS issue in the MBSFN service area based on the QoE reception report, wherein the QoS issue is detected on the MBSFN service area based on received signal strength indication (RSSI) data and evolved-universal mobile telecommunications system (UMTS) terrestrial radio access network (E-UTRAN) cell global identifier (ECGI) information received from a UE among the group of UEs.

5. The method of claim 4, wherein determining that the MBMS service has the QoS issue in the MBSFN service area based on the QoE reception report comprises:
   obtaining a behavioral mean opinion score (MOS) of each UE in the group of UEs, wherein the behavioral MOS is predetermined over a period of time;
   computing an experienced MOS of each UE based on the QoE reception report received from the group of UEs; and
   determining that the MBMS service has the QoS issue when the experienced MOS is less than the behavioral MOS.

6. The method of claim 5, further comprising modifying the behavioral MOS in response to determining a user behavior, wherein the user behavior comprises one of start of viewing the eMBMS service, stop of viewing the eMBMS service, and resuming the eMBMS service.

7. A core network node for managing quality of service (QoS) of an evolved multimedia broadcast multicast service (eMBMS) service in a wireless communication system, the core network node comprising:
   a memory; and
   at least one processor coupled with the memory and configured to:
      detect that more than one multimedia broadcast-multicast service (MBMS) services in a group of MBMS services have a similar popularity index,
      identify at least one network element with a QoS issue among network elements, in response to detecting that the more than one MBMS services in the group of MBMS services have the similar popularity index, wherein the network elements include the core network node, an access network node, a single evolved nodeB (enB), and a complete multicast broadcast single frequency network (MBSFN) service area, and
      modify QoS parameters of the at least one network element with the QoS issue.

8. The core network node of claim 7, wherein the at least one processor is further configured to:
   control to receive a consumption report from a group of user equipments (UEs) associated with the group of MBMS services in the MBSFN service area, and
   determine the similar popularity index in the group of MBMS services based on the consumption report.

9. The core network node of claim 8, wherein the consumption report comprises at least one of received signal strength indication (RSSI) data and evolved-universal mobile telecommunications system (UMTS) terrestrial radio access network (E-UTRAN) cell global identifier (ECGI) information.

10. The core network node of claim 7, wherein the at least one processor is further configured to:
   control to receive a quality-of-experience (QoE) reception report from a group of user equipments (UEs), and
   determine that an MBMS service has the QoS issue in the MBSFN service area based on the QoE reception report, wherein the QoS issue is detected on the MBSFN service area based on received signal strength indication (RSSI) data and evolved-universal mobile telecommunications system (UMTS) terrestrial radio access network (E-UTRAN) cell global identifier (ECGI) information received from a UE among the group of UEs.

11. The core network node of claim 10, wherein the at least one processor is further configured to:
   obtain a behavioral mean opinion score (MOS) of each UE in the group of UEs, wherein the behavioral MOS is predetermined over a period of time,
   compute an experienced MOS of each UE based on the QoE reception report received from the group of UEs, and
   determine that an MBMS service has the QoS issue when the experienced MOS is less than the behavioral MOS.

12. The core network node of claim 11,
   wherein the at least one processor is further configured to modify the behavioral MOS in response to determining a user behavior, and
   wherein the user behavior comprises one of start of viewing the eMBMS service, stop of viewing the eMBMS service, and resuming the eMBMS service.

* * * * *